Inventor.
George E. Ryan

Oct. 31, 1933.   G. E. RYAN   1,933,152
METHOD AND MACHINE FOR MAKING SADDLE STAPLES
Filed Dec. 6, 1932   6 Sheets-Sheet 4

Inventor
George E. Ryan

Oct. 31, 1933.                G. E. RYAN                1,933,152
         METHOD AND MACHINE FOR MAKING SADDLE STAPLES
                    Filed Dec. 6, 1932        6 Sheets-Sheet 5

Inventor:
George E. Ryan

Oct. 31, 1933.  G. E. RYAN  1,933,152
METHOD AND MACHINE FOR MAKING SADDLE STAPLES
Filed Dec. 6, 1932  6 Sheets-Sheet 6

Inventor.
George E. Ryan
atty

Patented Oct. 31, 1933

1,933,152

UNITED STATES PATENT OFFICE 1,933,152

METHOD AND MACHINE FOR MAKING SADDLE STAPLES

George E. Ryan, Fitchburg, Mass., assignor to Superior Manufacturing Company, Fitchburg, Mass., a corporation of Massachusetts Application December 6, 1932. Serial No. 645,923

56 Claims. (Cl. 59—77)

This invention relates to the manufacture of insulated, or saddle, staples, which staples pass through and carry strips of insulating material, as fibre, at their upper ends, which are folded in such manner as to provide insulating channels between the prongs of the staples, in which channels electric conductors and the like are adapted to be received, and also to form bridges or saddles which span the conductors or the like and prevent the staple from being driven home so far as to crush the conductors.

One of the objects of the present invention is a method and machine for making insulated staples automatically in a more rapid manner than heretofore.

A further object of the invention is in the provision of a machine for inserting staples in a successive manner into and along the length of a folded and otherwise prepared continuous insulating strip and subsequently severing the staple-containing strip between the staples.

Another object is in the provision of a machine for making insulated staples wherein a continuous length of an insulating strip or web is partially severed into staple sections, is perforated to receive the staples, folded into shape and has the staples inserted therein, and then has the separate sections severed from the web.

A further object is generally to improve upon staple making machines and methods.

Heretofore, in the manufacture of insulated saddle staples, saddle sections have been cut off from a flat web, formed into saddle shape, and had the staples inserted therein, or else the sections have been severed from the web during the act of inserting of the staple, the simultaneousness of the severing and staple-inserting operations being necessary for forming the section into proper shape. In accordance with the present invention, the saddle section is completely formed into saddle shape and the staple is completely inserted therein prior to the severance of the section from the web, whereby the insulating sections of successive staples are more uniform and a greater number of insulated staples can be made in a given time than heretofore.

Figures 7, 11, 19, 20, 21, 22, 23:
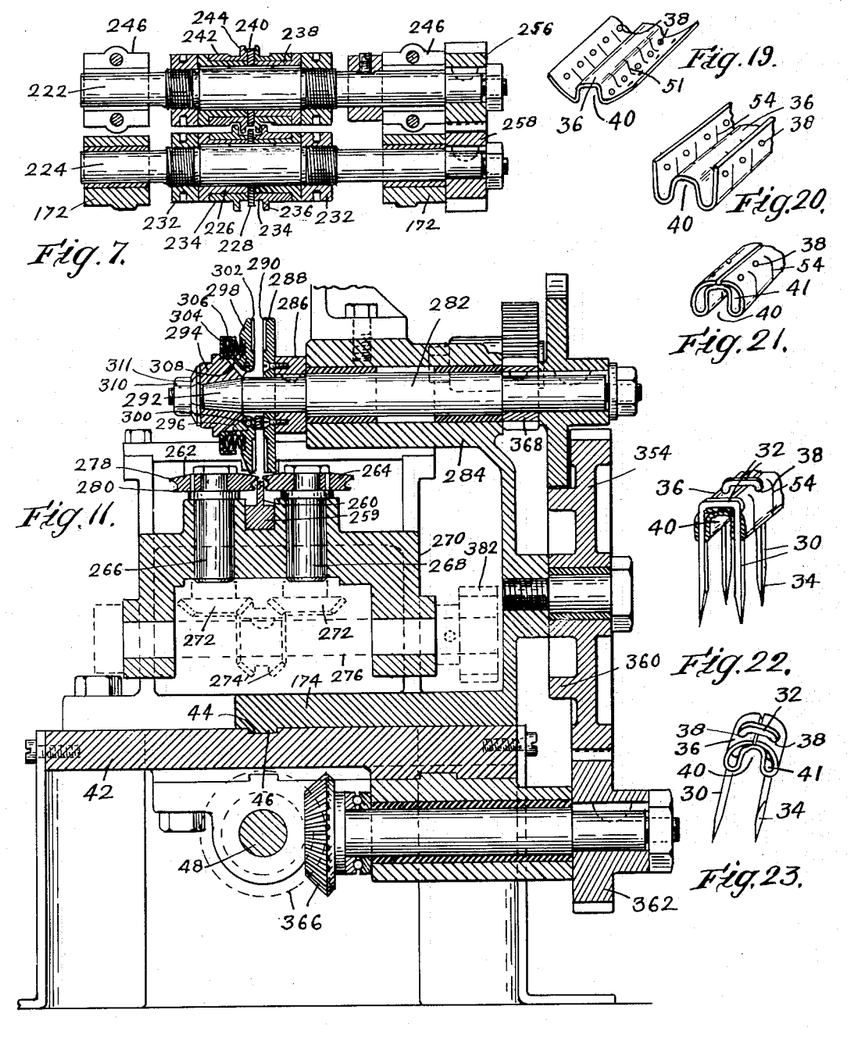
Fig. 7 is a sectional detail through the second set of folding rolls taken along line 7—7 of Fig. 1.
Fig. 11 is a sectional detail through the third set of folding rolls and also through the staple driving mechanism, taken along line 11—11 of Fig. 1.
Fig. 19 is a perspective detail of a section of the web showing the results of the third operation thereon, namely, the first folding operation.
Fig. 20 is a perspective detail of a portion of the web and illustrating the second folding operation.
Fig. 21 is a perspective detail of the third folding operation, which forms the completely folded web.
Fig. 22 is a perspective detail of a section of the folded web with a series of staples inserted therein.
Fig. 23 is a perspective detail of a completed insulated saddle staple which is a product of the machine of the present invention.

The insulated saddle staple made in accordance with the present invention is illustrated in Fig. 23 and is composed of a length of wire of either round or rectangular cross section reflexed into U form to provide the spaced parallel prongs 30 and the top connecting member or head 32. The ends of the prongs have, usually, oppositely inclined faces 34 that provide the prongs with sharp points. The staple is provided with an insulated saddle by a section or strip 36 of relatively stiff insulating material as fibre or the like which has a pair of perforations 38 in each end through which the prongs of the staple are passed and which is folded in such manner as to provide a middle channel 40 between the prongs and under the head 32, and the outside channels 41 on opposite sides of the middle channel and through which the prongs pass, the ends of the strip confronting each other under the head 32 and being superposed on the web that forms the bottom of the middle channel.

The present machine has provision for forming the insulating strips into saddle shape and for inserting the staples therein while the successive strips are integral with each other and for subsequently severing the connection between the formed strips. In the present machine the saddles are formed from a long or continuous web of insulating material, the staples, preformed by processes independent of this invention, are inserted in succession in the prepared and folded web, and the individual saddle staples are then severed from the stapled web.

Figure 17:
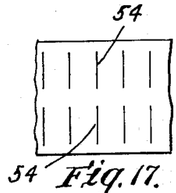
Fig. 17 is a plan detail of a portion of the web of insulating material and illustrating the first operation thereon, namely, that of slitting the web between individual saddle sections thereof.
Figure 18:
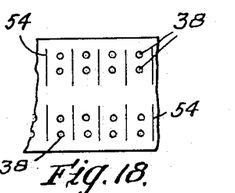
Fig. 18 is a view similar to Fig. 17, but illustrating the second operation on the web, namely, the perforating of the saddle sections to receive the staple.

The machine comprises a flat base or bed 42 adapted to support the various operating units and having a longitudinal groove 44 therein, see also Fig. 11, adapted to receive tongues 46 of the base or brackets of the various units and hold them in longitudinal alignment while permitting them to be adjusted longitudinally toward and away from each other to coordinate their operations upon the web. The base 42 is provided with a drive shaft 48 which extends longitudinally of the machine and is common to all of the various units. A web of insulating material 50, see especially Fig. 2, is taken from a roll 52 and is passed in succession through, and is continuous, between the various units and also is continuous after the staples have been inserted therein. The first operation on the web is to partially sever the web into saddle sections by providing the web with separate rows of longitudinally spaced transverse slits 54, see Figs. 2 and 17, located adjacent the side edges of the web, the spacing between consecutive slits being equal to the width of a saddle 36 and the transverse extent of the slits being such that when the web is folded into saddle shape the slits will lie in the down turned portions of the strip, as illustrated in Figs. 21 and 22, and the unslitted portion of the web will form the web for the bottom of the middle channel of the saddle. The purpose of slitting the web as thus described is to facilitate the final severing operation. The slitted web is then provided with repetitions of two aligned pairs of perforations 38, see Fig. 18, which lie in the rows of slits and between consecutive slits and each pair of which is adapted to receive a separate prong of the staple. The slitting and perforating apparatus is illustrated in Figs. 1, 2, 3, 4 and 14. The insulating web 50, which is of suitable width to be folded into saddle shape without the necessity for trimming or cutting, is drawn from the roll 52 and is passed over an anvil 58 and under a roller 60. Said anvil is carried by the horizontal shelf 62 of a bracket 64 secured to the base 42 and said roll 60 is journalled in blocks 66 vertically slidable on posts 68 carried by the anvil and pressed toward the anvil by springs 70. The purpose of the roll is to place the web under a suitable amount of tension and to hold it flat. The web passes from the roll 60 through the grooves formed between the guide blocks 72 and plates 74 thereon, the blocks being adjustable transversely of the web so that they can be set to guide the web accurately into the slitting and perforating mechanisms and also to compensate for slight variation in width of successive webs. The web passes from the guide blocks 72 over the top face of a block 76 which forms a stationary knife and cooperates with a slitting knife 78 of the slitting mechanism. Said slitting knife 78, see especially Fig. 2, is provided with a notch 80 in its cutting edge which notch is of sufficient extent to leave an unslitted section of suitable short length of the web between the aligned confronting slits in each row thereof. The length of the cutting edge of the knife is such, and the knife is so positioned, as to leave unslit marginal portions of the web at the outside edges of the rows of slits. The lengths of the slits preferably are adapted to be such as to traverse all of the down-turned sides or legs of the saddle, so that only the top or connecting part of the saddle legs need be severed during the final severing operation, although, there should be sufficient connection between the saddle sections as to permit the various operations on the web without rupture between the sections. The knife 78 is removably and vertically adjustably secured by means including a bolt 82 to a cross bar 84 which is fixed to the upper ends of a pair of guide rods 86 that are disposed on opposite sides of the web and are guided for vertical reciprocatory movement in the shelf 62 and also in the bosses 88 of the bracket 64. A second cross bar 90 is secured to said guide rods 86 beneath said shelf 62 and is connected through a bolt 92 and an eccentric bushing 94 thereon with the upper end of an eccentric strap 96 the lower or large end of which encircles an eccentric 98 fixed to and rotatable with the drive shaft 48. With this arrangement the guide rods 86 and the slitting knife 78 are caused to reciprocate by the rotation of the drive shaft. The depth of the cut of the slitting knife can be adjusted by suitable adjustment of the eccentric bushing 94. The present machine employs several similar eccentric straps for operating its reciprocatory mechanism and all are or may be adjustable by similar eccentric bushings 94.

At times the slitting knife may leave a bur or lip on the underside of the web at the edges of the slits and these burs may catch on the edge of the stationary knife and hinder the free advance of the web. To prevent this possible catching of the web a bar 100 is disposed in front of the stationary knife and under the path of movement of the web and mounted at its ends on guide rods 102 and urged toward an elevated position by springs 104 which encircle said rods. With this arrangement the pressure of the slitting knife 78 on the web forces the bar 100 down sufficiently to permit the web to engage the top face of the stationary knife 96 and thus to allow the slits to be formed. When the slitting knife is elevated, however, the springs 104 serve to raise the bar 100 and the web thereon sufficiently to lift the web and any burs that may be on the underside thereof above the top of the stationary knife and thereby permit the web to be advanced without hindrance from such burs.

Figure 1:
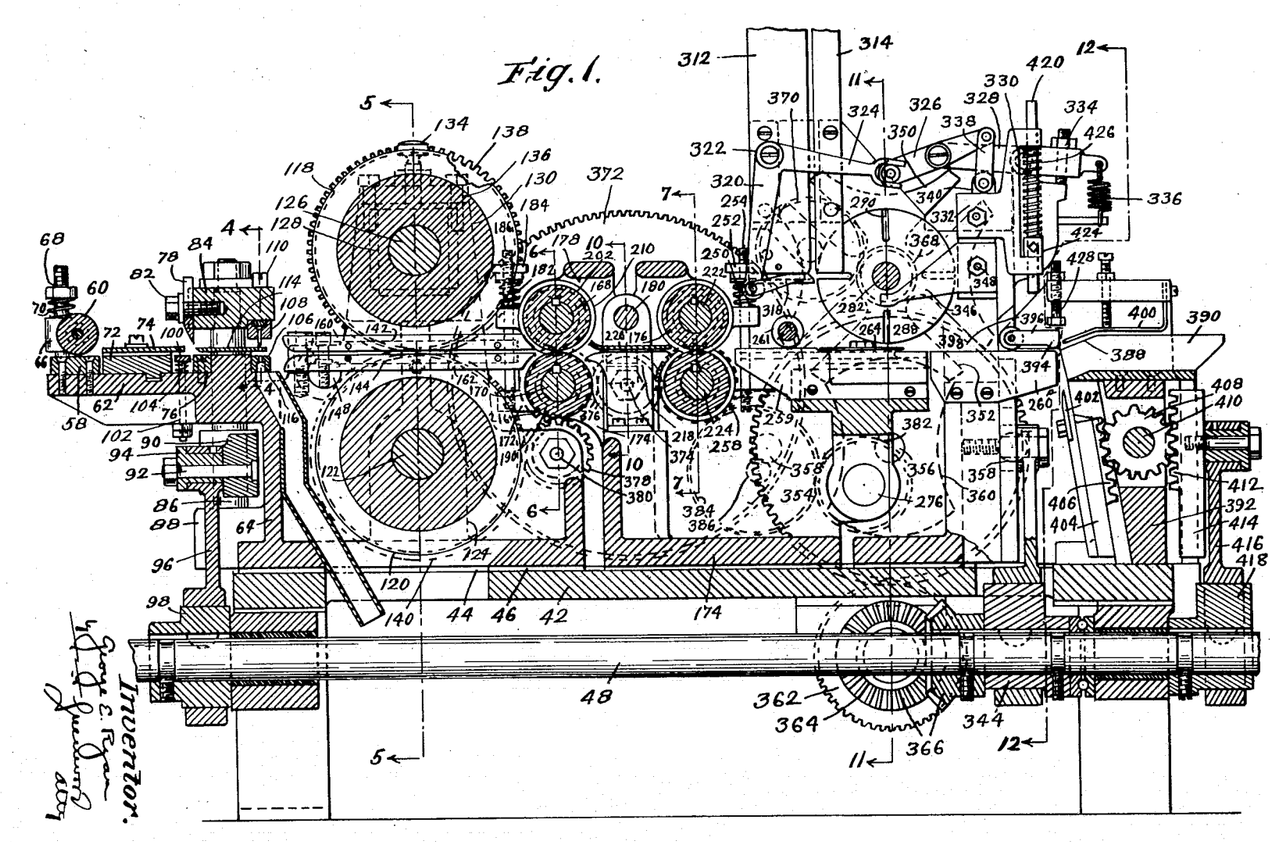
Fig. 1 is a sectional elevation taken through the longitudinal axis of a saddle staple machine embodying the present invention.
Figure 2:
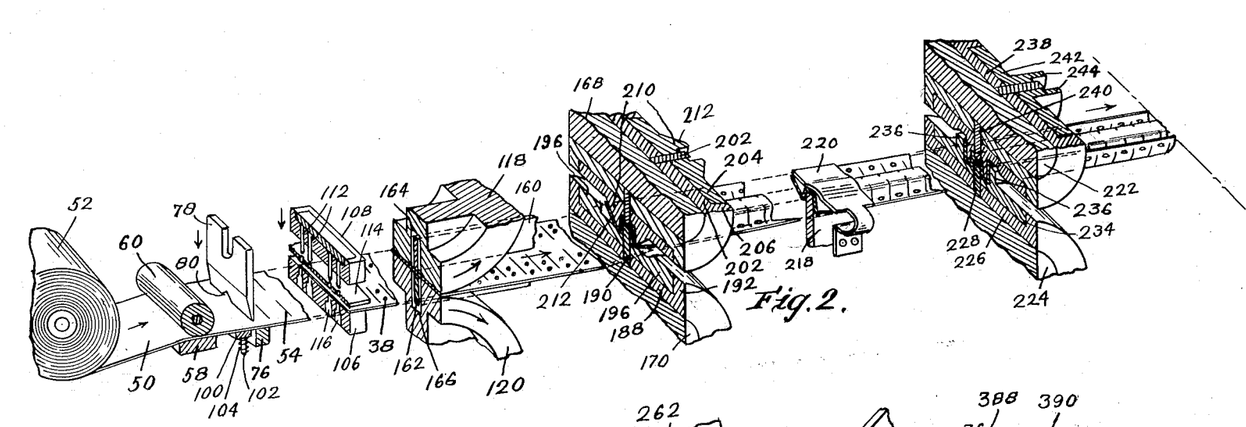
Figs. 2 and 2a represent in perspective a more or less diagrammatic arrangement of the various elements of the machine of Fig. 1 and their functions.
Figure 4:
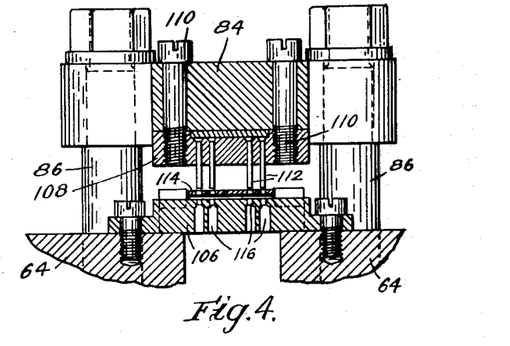
Fig. 4 is a sectional detail of the web perforating mechanism taken along line 4—4 of Fig. 1.

The web advances between the guide rods 86 to a position over a female die 106, see especially Figs. 1 and 4, where the perforations 38 are formed in the web. The cross head 84 has a male die 108 secured thereto by screws 110; and said male die has two pairs of perforating pins 112 which pass through perforations of a stripper plate 114 and enter corresponding passages 116 of the female die.

It will be understood that the web is advanced in an intermittent or step by step manner and that the slitting and perforating operations just described and the staple inserting and severing operations subsequently to be described are performed when the web is stationary.

Figures 5, 6, 14:
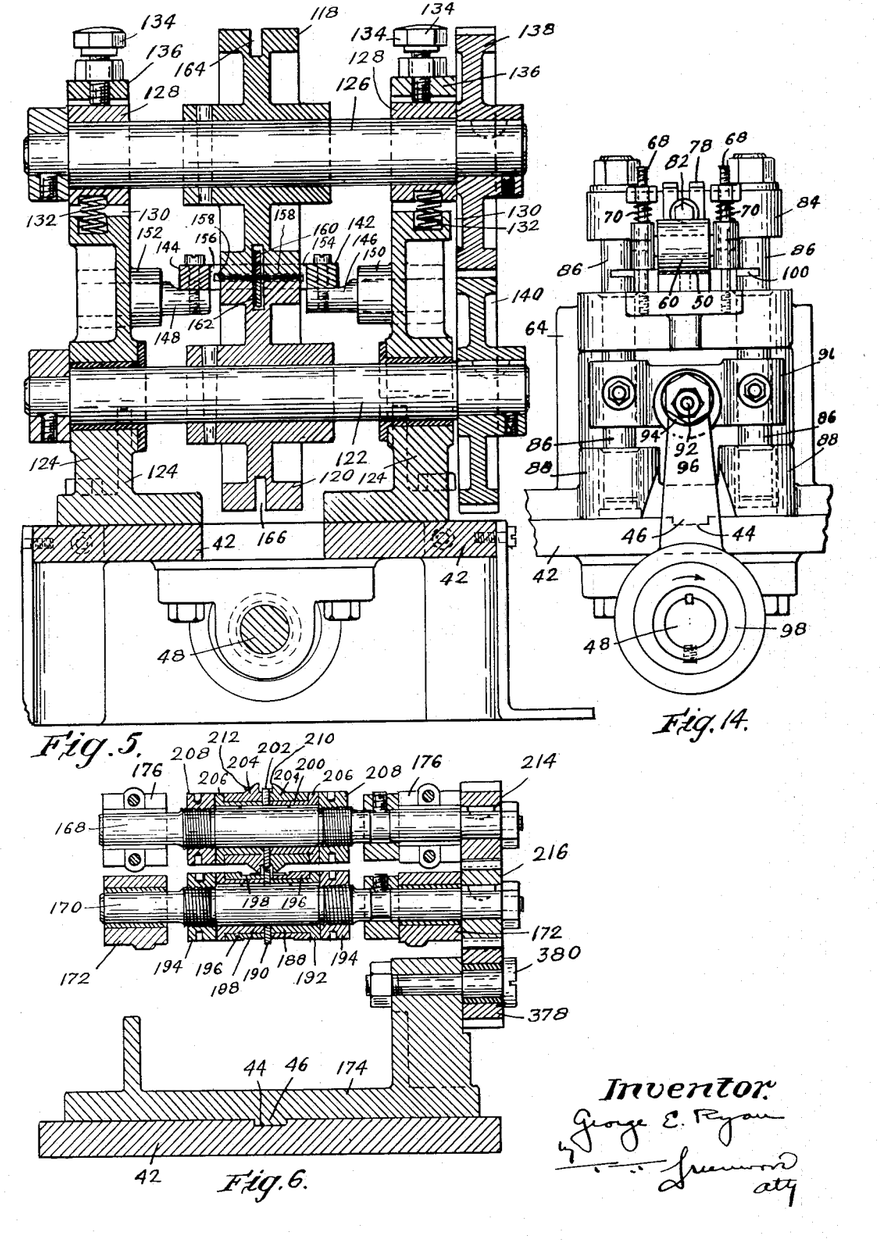
Fig. 5 is a sectional elevation of the web driving rolls taken along line 5—5 of Fig. 1.
Fig. 6 is a section through the first web folding rolls taken along line 6—6 of Fig. 1.
Fig. 14 is an elevation of the entrance end of the machine.

The perforated web passes into the bite of upper and lower feed rolls 118 and 120 respectively, see Figs. 1, 2 and 5, which rolls constitute the means which govern the advance of the web through the machine. While there are other driven rolls presently to be described which tend to exert a driving effect upon the web their action is subordinate to the action of the rolls 118 and 120 so that said web is advanced by amounts that are governed entirely by said rolls 118 and 120. Said lower roll 120 is fixed to a shaft 122 journalled in upstanding brackets 124 carried by the base 42. The upper roll 118 is fixed to a shaft 126 which is journalled in bearing blocks 128 that are guided for vertical movement between upstanding ears 130 of said brackets 124 and are urged upwardly by compression springs 132, said springs serving merely to raise the roll 118 from engagement with the web when the bearing blocks are free for upward movement. Said bearing blocks are urged in a downward direction by screws 134 screw-threaded in cross bars 136 overlying and fixed to the upper ends of said ears 130. Said screws 134 bear upon the tops of said bearing blocks and thus serve to force the upper roll 118 into a firm and non-slipping driving engagement with the web on the lower roll 120. Intermeshing spur gears 138 and 140 are fixed to the shafts 126 and 122, respectively, and have pitch diameters equal to the diameters of the driving faces of their respective upper and lower rolls 118 and 120 so that said rolls are caused to rotate positively at the same peripheral speed. The rolls are advanced in an intermittent manner as will be presently explained.

The paper web is guided through said web advancing rolls and into the bite of the first folding rolls by separate but confronting guide plates 142 and 144, see Figs. 1 and 5, which plates are secured respectively to stud shafts 146 and 148 that are independently angularly adjustably secured in pinch bearings 150 and 152 of the brackets 124 so that said guide plates can be raised or lowered to position them as desired. The guide plates also are adjustable toward and away from each other to compensate for small variations in width of successive webs. The guide plates have confronting recesses 154 and 156 in which the engaging peripheral portions of the web advancing rolls 118 and 120 are located. Said plates also have confronting longitudinally extended slots or guideways 158 along which the web advances. Vertical plates 160 and 162 are secured to one of the confronting faces of one of said plates, as the plate 154, and overlie opposite sides of the path of travel of the web and are loosely received respectively in peripheral grooves 164 and 166 of said web advancing rolls 118 and 120. Said plates serve to maintain the web horizontal as it passes into and out of said advancing rolls and toward the first folding rolls and thereby prevents the web from any tendency to buckle as it advances under the drive of said rolls.

Figures 2A, 8, 9:
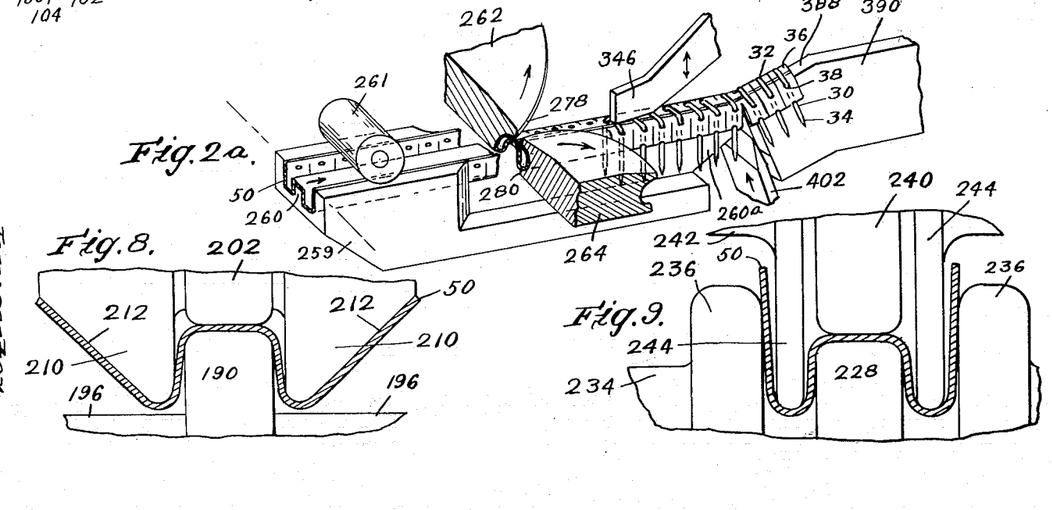
Figs. 8 and 9 are enlarged details of the cooperating regions of the rolls of the first and second sets respectively and illustrating the nature of the folds imparted to the web thereby.
Figure 3:
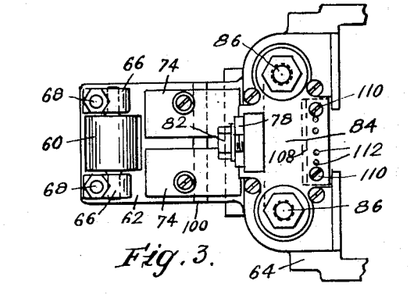
Fig. 3 is a plan view of the web slitting and perforating mechanism.

The web is folded into the shape illustrated in Fig. 19 by folding rolls, illustrated in Figs. 1, 2, 6 and 8. Each folding roll comprises driven and idler sections, said rolls being carried by the upper and lower shafts 168 and 170 respectively, the lower shaft being journalled in bearings in opposed side plates 172 of a supporting frame 174 fixed to the base 42. The upper shaft 168 is journalled in the opposite arms 176 of a U shaped frame 178, the arms of which are pivotally mounted on a cross shaft 180 extended between and carried by the side plates 172 of said bracket 174. The upper shaft is urged toward the lower shaft by compression springs 182, one of which is shown in Fig. 1, which springs bear against said frame 178 and also on nuts 184 screw-threaded adjustably on rods 186 carried by the side plates 172. The lower roll comprises a pair of sleeves 188 which are keyed to but are axially adjustable on said shaft 170 and are disposed on opposite sides of a radially outstanding disc or flange 190 which is keyed to and is axially adjustable on said shaft and has a width which is equal to the width of the recess 40 of the insulated saddle, see Fig. 23. The sleeves 188 have outstanding end flanges 192 which confront collars 194 adjustably screw-threaded on the shaft and adapted to hold the sleeves and disc 190 in the center line of the web. Sleeves 196 are loose on the sleeves 188 and are disposed on opposite sides of the disc or flange 190 and have counter-sunk peripheral portions 198 which confront said flange and are adapted to form clearance spaces into which the folds of the web may pass without necessarily engaging the sleeves. Said sleeves 196, however, are freely rotatable so that they can be driven by the web. The upper roll comprises a pair of sleeves 200 which are keyed to and are axially adjustable on the upper shaft 168 on opposite sides of a radial outstanding disc or flange 202 that is disposed in the plane of the flange 190 and is adapted to engage the web on said flange 190. Sleeves 204 are freely rotatable on the sleeves 200 on opposite sides of the flange 202 and are retained against axial displacement between end flanges 206 of the sleeves 200 and confront adjustably screw-threaded collars 208 on the shaft 168. The sleeves 204 are provided with outstanding peripheral ribs 210 which are of greater diameter than the diameter of the flange 202 and are spaced axially away from said flange and from the cooperating flange 190 by a distance that preferably is somewhat greater than the thickness of the web, as is illustrated in Fig. 8. The ribs 210 are provided with conical faces 212 on the sides away from the flange 202, the inclination of said faces corresponding to the inclination imparted to the marginal portions of the web in passing through the rolls. In the passage of the web through the rolls the web is engaged between the flanges 202 and 190 along the median line thereof. The ribs 210 engage the web on opposite sides of said flanges and force the material of the web on opposite sides of the median line downwardly over the radial side faces of the rib 190. This folding action causes the outstanding marginal portions of the web to be drawn inwardly and upwardly so that when the web emerges from the rolls it has been folded into the shape illustrated in Figs. 8 and 19. The flanges 202 and 190 are positively driven at the same peripheral speed by intermeshing gears 214 and 216 which are fixed respectively to the upper and lower shafts and have pitch diameters equal to the diameters of said flanges. The upper and lower shafts are positively driven as will be explained hereinafter, but the driving effect of said flanges 202 and 190 on the web is adapted to be less than that of the driving rolls 118 and 120 and said flanges preferably are adapted to advance the web at a slightly greater rate than said driving rolls and to slip the difference so that the advance of the web is controlled by the web advancing rolls. Due to the fold of the web in passing through the first set of folding rolls the web engages the loose sleeves at different diameters thereof and hence said sleeves are arranged to be freely rotatable so as to rotate idly without influencing the advance of the web.

Figure 10:
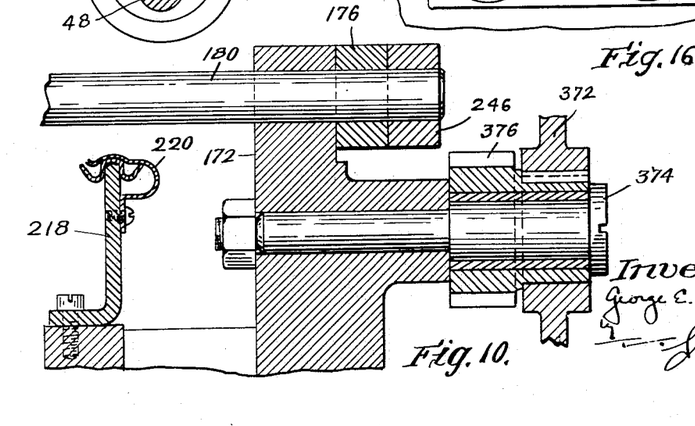
Fig. 10 is a sectional detail taken along line 10—10 of Fig. 1.
Figure 12:
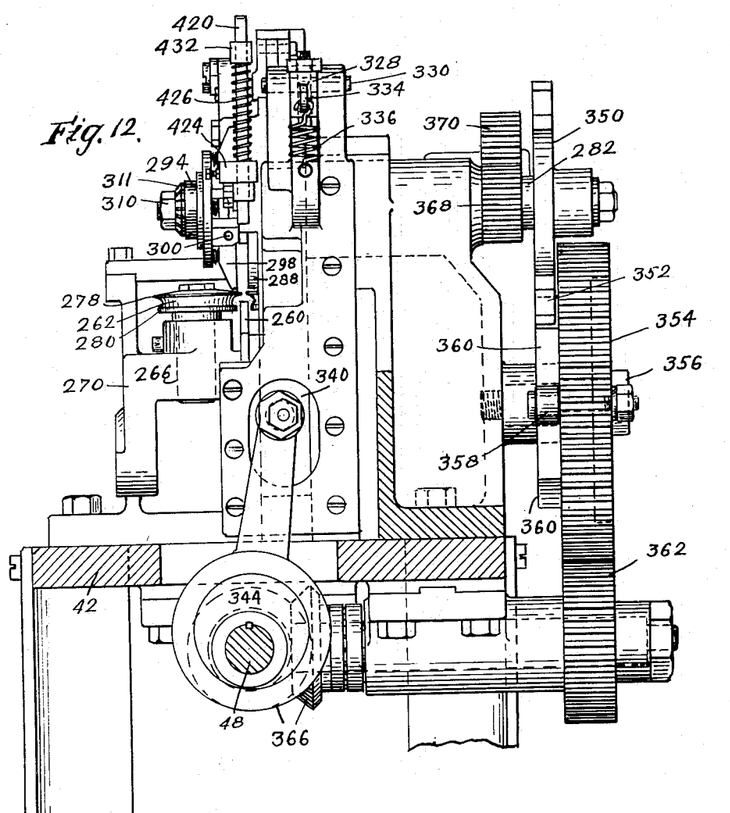
Fig. 12 is a sectional elevation taken along line 12—12 of Fig. 1.

The web is guided in its advance from the first set of folding rollers to the second set of folding rollers by a guide comprising an upstanding rib 218, see Figs. 1 and 10, which rib enters the longitudinal groove or channel 40 of the partially folded web and holds it against transverse displacement. A guide plate 220 is secured to said rib and overlies the top of the web and thus holds it on the rib.

The second set of folding rollers are constructed substantially like the first set, except that their configuration is changed to fold the web from the configuration of Fig. 19 to that of Fig. 20. The second set of upper and lower folding rollers includes the upper shaft 222 and the lower shaft 224, see Figs. 1 and 7. The lower folding roller includes sleeves 226 which are fixed on the lower shaft 224 for conjoint rotation therewith but are axially adjustable thereon and are positioned on opposite sides of a radially outstanding disc or flange 228 that is keyed to and is axially adjustable on the shaft. Said sleeves and disc are secured in axially adjusted positions on said shaft by collars 232 that are screw-threaded on said shaft. Sleeves 234 are freely rotatable on said sleeves 226 on opposite sides of said flange 228 and said sleeves have radially outstanding peripheral flanges 236 which are disposed on opposite sides of and are spaced axially from the flange 228 and provide channels therebetween in which the material of the web is folded. The upper roll comprises sleeves 238 that are mounted for axial adjustment along and for conjoint rotation with the upper shaft 222 in a manner similar to the lower roll. Said sleeves are disposed on opposite sides of a radially outstanding peripheral flange or disc 240, similar to the flange 228, that is disposed in line with and cooperates with the flange 228 of the lower roll in engaging the web. Sleeves 242 are freely rotatably mounted on said sleeves 238 on opposite sides of the flange 240 and are provided with radially outstanding peripheral flanges 244 at their inner ends and adjacent and on opposite sides of the flange 140 and are adapted to rotate within and spaced from the channels between the flanges of the lower roll as is most clearly indicated in Fig. 9. It will be apparent that as the web advances, the middle portion of the web is engaged by the driving flanges 228 and 240 and that the marginal portions of the web are folded by the flanges 244 into the annular grooves of the lower roll; and the arrangement is such that the marginal portions are folded substantially at right angles to the medial portion of the web, or as is illustrated in Figs. 9 and 20.

The lower shaft 224 is journalled in the previously mentioned side plates 172 of the bracket 174. The upper shaft 222 is journalled in the paralled arms 246 of a U-shaped frame 248, the arms of which are pivotally supported on the pivot shaft 180, see Fig. 10. The upper roll is urged toward the lower roll by compression springs 250 that bear against said frame and also against nuts 252 that are adjustably screw-threaded on rods 254 carried by said bracket 174. The upper and lower shafts are connected for positive rotation by intermeshing spur gears 256 and 258 which are fixed in the ends of said shafts and have pitch diameters equal to the diameters of said flanges 240 and 228 so that said flanges rotate at the same peripheral speed, which speed preferably is slightly greater than the speed of advance of the web, so that the flanges slip slightly on the web.

The web passes from the second set of folding rolls into a track 259 having a guide rib 260 which enters the channel 40 of the folded web, the track having channels which receive the folded marginal portions of the web, see Fig. 2a, and the web being held therein by means including a roller 261 which overlies the track. The web in the track advances between a pair of cooperating folding rolls 262 and 264, see Figs. 1, 2a, and 11, which rolls hold the upstanding marginal portions of the web inwardly into horizontal position in confronting relation with each other on top of the intermediate section of the web as is illustrated in Fig. 21. Said rolls are horizontally disposed on opposite sides of said guide rib 260 and are supported by vertical shafts 266 and 268 respectively which are journalled in a top plate 270 of the bracket 174. Said rolls 262 and 264 are preferably idler rolls and are not positively driven except that they are adapted to rotate in engagement with the paper web and by the advancing movements thereof. For this purpose said rolls can be loose on their supporting shafts in an obvious manner or they can be fixed thereto and said shafts arranged to rotate freely. Under some circumstances, however, it might be found advantageous to drive said rolls positively. For this purpose, said shafts can be extended downwardly and provided with bevel gears 272 at their lower ends as indicated in the dotted lines Fig. 11. Said gears are in mesh with cooperating bevel gears 274 fixed to a shaft 276 which is journalled in the side plates 172 of said bracket 174 and is driven positively in a manner to be explained later. Said rolls 262 and 264 have upper and lower radially outstanding flanges 278 and 280 which define between them grooves in which portions of the folded web are received and retained during the folding operation. The lower flanges 280 are adapted to be located under the folds of the web that lie on opposite sides of the median line thereof to support the folds against displacement during the final folding operation and the upper flanges 278 are adapted to engage the vertically upstanding marginal portions of the web and fold them over into a horizontal position with their ends confronting and on top of the middle portion of the web to provide a cross sectional shape as illustrated in Fig. 21, the folding operation being effected by the wiping-in of the marginal portions of the web during the advance thereof.

The staples are inserted in the completely folded web on the rib 260 immediately after the completely folded portion of the web is advanced from the last set of folding rolls and preferably while the web is close enough to said rolls to be retained in folded position thereby. The staple driving mechanism includes a horizontal shaft 282 which is rotatably supported in a bearing bracket 284 of said bracket 174 somewhat in advance of the vertical plane through the axis of said folding rolls 262 and 264. Said shaft has a hub 286 fixed thereto that is provided with a radial staple-carrying plate 288 that has four right angularly related radial grooves or slots 290 in its front face, see especially Fig. 13, that extend inwardly from the periphery of the plate and are adapted to receive one of the prongs of the staples. Said shaft 282 extends forwardly beyond the plate 288 and is provided with a tapered section 292 on which a hub 294 is seated. Said hub is provided with rearwardly extended bifurcated arms 296 between the furcations of which outstanding fingers 298 are pivoted on pivot pins 300. Said fingers are provided with radial grooves or slots 302 each of which fronts a separate slot 290 of the plate 288 to cooperate therewith in forming a channel within which successive staples are adapted to be received and retained. The hub 294 is provided with a ring 304 between which and the several fingers 298 compression springs 306 are disposed which urge said fingers toward said plate 288 and thereby resiliently clamp the staples therebetween. The fingers are adapted to yield outwardly against the action of said springs during the insertion of staples between them and said plate. Said fingers are provided with forwardly extended lips 308 which are located under and are adapted to engage said ring 304 to limit the movement of the fingers toward said plate at times when no staples are engaged by the fingers. Said hub 294 is secured to said shaft 282 by means including a nut 310 which is screw-threaded onto the end of the shaft. Preferably, however, while said hub has a normal positive driving connection with said shaft, the driving connection is adapted to slip, as by a spring washer 311 interposed between said nut and web, if there is an unusual resistance to the rotation of the hub occasioned by an incomplete staple driving or inserting operation or the like in which event the grooves in the fingers become displaced from the grooves 288 and the device refuses to accept further staples until the trouble has been cleared and the finger grooves realigned with the plate grooves.

Figure 13:
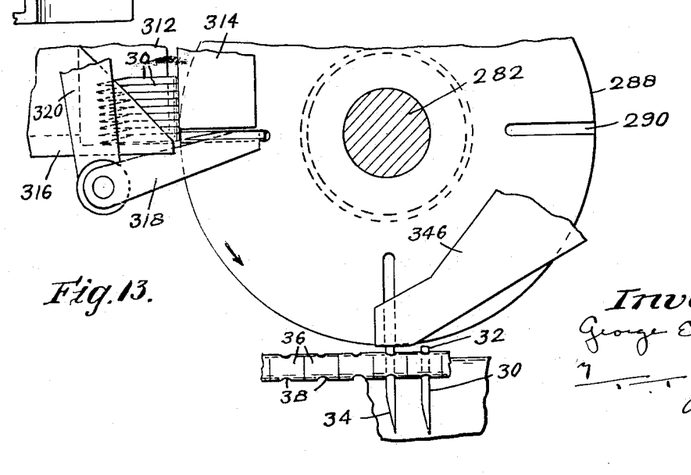
Fig. 13 is an enlarged detail of the staple positioning and driving mechanism.

The staples are formed independently of the present mechanism and are fed out of an overhead hopper, not shown, down a guide track including the spaced parallel plates 312 and 314, see Figs. 1 and 13, with the prongs of all of the staples overlying the opposite sides of the plates 312 and the heads disposed in the space between the plates 312 and 314. The staples accumulate in a vertical stack on and between said plates with the prongs of the lowermost staple of the stack resting upon a plate 316 which is slotted between the prongs. The guide track is so disposed with respect to the rotatable staple holding plate or carrier 288 that when a channel 290 is in staple driving position vertically above the folded web under the plate, another channel 290 is in staple receiving position in confronting and aligned relation with the lowermost staple of the stack. The successive lowermost staples of the stack are inserted head foremost into the aligned grooves 290 of the plate 288 and the fingers 298 by a pusher 318 which underlies the staples of the stack and is adapted to be reciprocated towards the right, see Figs. 1 and 13, to engage the head of the lowermost staple and to move the staple into the engagement of the plate 288 and the fingers 298 and to move toward the left into a position to engage and advance a second staple. Said pusher 318 is pivotally carried by the lower end of a lever 320 and is urged upwardly by a spring, not shown, into operative relation with the staples. The lever 320 is pivoted on a stud 322 secured to a supporting bracket for the staple guide plate 312 and has a bifurcated horizontally extended arm 324 that has a rocking engagement with one end of a lever 326. Said lever is pivoted to one end of a normally rigidly supported lever 328 which is pivoted at 330 to the top of an upstanding bracket 332 fixed to the base 42. Said lever 328 is normally held yieldingly in the aforesaid position with an adjustable stop member 334 thereof against an ear of said bracket by a tensile spring 336, the lever 326 being adapted to be reciprocated to reciprocate the pusher 318 for the purpose of delivering successive staples. If either because of a defective staple or because of another reason undue resistance is offered to the movement of the pusher, the lever 328 is adapted to yield downwardly against the action of the spring 336 and thereby function as a safety device in preventing the breaking of the lever system. The free end of the lever 326 is pivotally connected through a link 338 with the upper end of a slide member 340 which is reciprocated vertically in a guideway in the bracket 332 by an eccentric 344 driven by the drive shaft 48.

The staples are driven out of the slots in the carrier plate 288 and into the holes or perforations 38 in the folded saddle web by means including a driver 346 which is disposed in the space between the carrier 288 and the fingers 298 and under the shaft 282 and over the guide rib 260, which constitutes an anvil. Said driver is secured by means including a bolt 348 to the side of the slide 340 and reciprocates therewith. The driver overlies the tops or heads of the staples when they are in vertical position above the web and drives them downwardly out of the slots in the carrier plate and the cooperating fingers and into the web.

The spacing of the various elements of the machine is so arranged that the web advances by the distance between two consecutive sets of holes 38 for each operation of the driver. The carrier plate and its associated parts are rotated 90° during each advancing movement of the web so as to position the staples in the successive slots into position to enter the successive holes in the folded web. The staple carrier and the web advancing rolls and the first and second sets of folding rolls, and also the third set of folding rolls if these are positively driven, are advanced in an intermittent manner by means including a Geneva wheel 350 fixed to the shaft 282 and having four radial and equi-angularly spaced slots 352. An idler gear 354 is rotatably supported on a stud 356 beneath the Geneva wheel and carries a pair of diametrically opposed rolls 358 which are alternately adapted to enter and leave the successive slots 352 of the Geneva wheel and thereby to advance the wheel 90° for each half revolution of the idler gear. The idler gear is also provided with a cam disc 360 of more or less usual construction that engages the Geneva wheel at times when the driving rolls are not engaged therewith for the purpose of holding the Geneva wheel stationary. The idler gear 354 is driven from a pinion gear 362 fixed to a shaft 364 journalled in a bracket carried by the underside of the frame 42 and driven from the drive shaft 48 through a pair of bevel gears 366. The various web advancing and folding rolls are driven through the Geneva wheel. The shaft 282 has a spur gear 368 fixed thereto which drives an idler gear 370, see Fig. 1. Said idler gear is in mesh with a large gear 372 that is journalled on a stud 374, see Figs. 1 and 10, and has a pinion gear 376 fixed thereto. Said pinion gear engages the gear 216 of the lower one of the first set of feed rolls and the gear 258 of the lower one of the second set of feed rolls. Said gear 216 of the first set of rolls drives an idler gear 378, see Figs. 1 and 6, rotatable on a stud 380 of the bracket 64 and said latter gear drives the gear 140 of the lower web advancing roll. If the last folding rolls 262, 264 are positively driven, the drive shaft 276, see Fig. 11, has a gear 382 which meshes with an idler gear 384 journalled on a stud 386 carried by a side plate 172 of the bracket 174 and meshing with the lower gear 258 of the second set of folding rolls. With this arrangement all rolls are advanced in a step by step manner in synchronism with each other.

Figure 15:
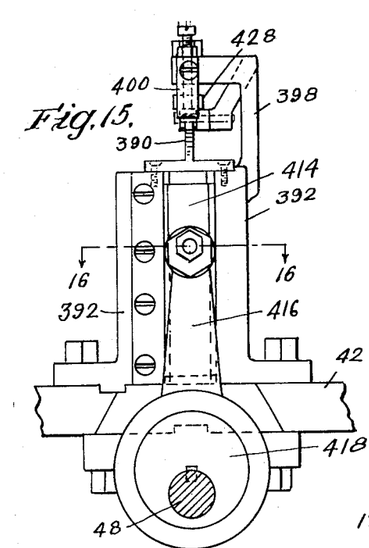
Fig. 15 is an end elevation of the delivery end of the machine.
Figure 16:
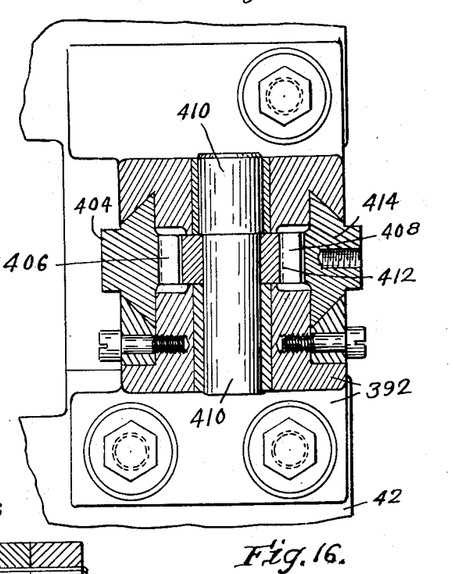
Fig. 16 is an enlarged sectional detail of the mechanism for operating the severing knife taken along line 16—16 of Fig. 15.

The web with a succession of staples driven therein and appearing as illustrated in Fig. 22, advances from the last set of folding rolls over the guide 260a which while separate from the guide 260 is in effect a continuation thereof. The stapled web moves forwardly over said guide to a convenient severing position where the successive insulated staples are severed from the web. At the severing position, the stapled web is bent upwardly to spread apart the connected sections thereof at the slits 54, as is best illustrated in Figs. 1 and 2a, so as to facilitate the entrance of the severing knife between the web sections. For this purpose, the stapled web passes from the guide 260a onto and upwardly along the inclined portion 388 of a guide 390, see also Fig. 15, which guide is secured to the upper end of a standard 392, fixed to the base 42. The stapled web passes under the anvil 394 of a lever 396 which is pivoted to an arm 398 of said standard 392, which anvil is disposed to overlie the knife space between the guides 260a and 390 and to support the web against the cutting action of the knife. A resilient guide plate 400 overlies the heads of the separate staples moving along the guide 390 to hold the separated staples onto the guide 390 in their movement to the end thereof where they fall into a convenient chute or receptacle. A severing knife 402 is vertically reciprocable generally along the line of the bisector of the angle between the guides 260a and 390 and is carried by a slide 404, see especially Figs. 1, 15 and 16, that is reciprocable in a guideway of the standard 392. Said slide 404 has gear teeth 406 on its rear face which mesh with the gear teeth of a reversing gear 408 pivoted on a shaft 410 journalled in said standard. Said gear also meshes with the gear teeth 412 of a second slide 414 which is vertically reciprocable in said standard 392 by an eccentric strap 416 operated by an eccentric 418 of the drive shaft 48. The reciprocatory movements of the slide 414 thereby cause the slide 404 to reciprocate toward and away from the stapled web and the arrangement is such that the knife accurately enters the spaces between the spread web sections and severs the connected portions of the sections when they are held against the anvil 394. The severing operation takes place at the same time a staple is driven into the web. Mechanism is provided to press the anvil 394 toward the knife during the severing operation.

Said mechanism includes a plunger 420 vertically slidable in a bracket 432 secured to and reciprocable with the slide 340 that carries the staple driver 346. Said plunger 420 has a collar 424 secured to the lower end thereof against which a compression spring 426 bears thereby holding the plunger resiliently in its lowermost position. At each down stroke of the driver 346, the plunger 420 is brought into contact with the anvil lever 396 and then is adapted to yield while maintaining its engagement therewith, thereby to hold the web securely on the guide 260a and against the anvil. When the knife comes up against the web, the pressure of the knife can force the anvil lever up against the action of the spring 426 but only until said lever is brought into engagement with a vertically adjustable stop member 428 which positively holds the anvil stationary against the action of the knife so that the knife can cut through the unslitted portion of the web between the various sections thereof. Due to the spreading of the web sections after the slitted portions thereof, the knife is effective to sever the sections accurately since the inclined faces of the sections serve to guide the knife directly to the unslitted portions of the web. This accuracy is maintained regardless of any small changes in the length of the web due to atmospheric and other conditions. If the web has a tendency to position its slitted portions somewhat to the right (Fig. 1) of the line of the knife, the web can be moved backwardly by the knife and buckle in advance of the last folding rolls and thereby permit an accurate severing operation regardless of minor changes in the length of the web between the stapling and severing positions. In practice, the machine is adjusted so that any variation in length that might take place from time to time is always such that the web can buckle between the staple driving and severing positions.

The slitting of the web previous to the folding thereof facilitates the folding operation since the resistance to folding is reduced. The slitting also facilitates the severing operation by permitting the sections to be spread apart in the manner above described and further facilitates the severing operation since all of the unsevered portions of the web are horizontal in the folded web and can be supported against the anvil and thus there is no danger of crushing the web or the sections during the severing operation.

I claim:

1. The method of making insulated saddle staples which comprises forming an insulating web into saddle shape, inserting a series of staples into the formed web, and subsequently severing the formed stapled web between successive staples.

2. The method of making insulated saddle staples which comprises forming an insulating web into saddle shape, inserting staples into the formed web and providing a long length of formed web with staples therein, and subsequently severing the stapled web between successive staples.

3. The method of making insulated staples which comprises forming an insulating web longitudinally into a general U-cross section, inserting a series of staples into the formed web, and subsequently severing the web between successive staples.

4. The method of making saddle staples which comprises forming a web into saddle shape, inserting a series of staples into the web with the prongs thereof disposed between confronting sections of the web, and subsequently severing the formed web between successive staples.

5. The method of making saddle staples which comprises folding a web longitudinally to provide a middle longitudinal channel and outer channels on opposite sides of said middle channel, inserting staples in the web with the prongs thereof traversing the outer channels and straddling the middle channel, and severing the web between successive staples.

6. The method of making insulated saddle staples which comprises forming a series of perforations longitudinally disposed in a flat web, forming the perforated web into saddle shape, inserting a series of staples in the perforations, and subsequently severing the web between the individual staples.

7. The method of making saddle staples which comprises forming a series of perforations longitudinally disposed in a flat web, forming the perforated web into saddle shape, inserting a series of staples in the perforations, and severing the web between the staples.

8. The method of making saddle staples which comprises partially severing a web transversely between successive saddle sections, inserting staples in the successive sections, and then completely severing the web between the sections.

9. The method of making saddle staples which comprises partially severing a web transversely between successive saddle sections, forming the partially severed web into saddle shape, inserting staples in the successive sections of the formed web, and then completely severing the web between the sections.

10. The method of making saddle staples which comprises partially severing a flat web transversely in a series of locations longitudinally located in the web, to partially separate the web into a plurality of saddle sections, forming the partially severed web into saddle shape, inserting a series of staples in the sections, and subsequently completely severing the web between the sections.

11. The method of making saddle staples which comprises partially severing a flat web transversely in a progressive manner in a series of locations longitudinally disposed in the web, to form the web progressively into a plurality of saddle sections, progressively forming the partially severed sections into saddle shape, progressively inserting staples in the sections, and then completely severing the sections from the web.

12. The method of making saddle staples which comprises providing a web with partially severed formed saddle sections, inserting staples in the sections, and then completely severing the sections from each other.

13. The method of making saddle staples which comprises providing a flat web with a series of perforations longitudinally disposed in the web and with transverse slits in the web between the perforations, forming the perforated and slit web into saddle shape, inserting staples in the perforations, and severing the web between the staples at the slits.

14. The method of making saddle staples which comprises forming a longitudinal series of transverse slits in a web, perforating the web between consecutive slits therein, forming the web into saddle shape, inserting staples in consecutive perforations of the web, and severing the web between successive staples at said slits.

15. The method of making saddle staples which comprises forming a succession of spaced pairs of aligned slits transversely disposed in a web and inset from the margins thereof, the succession of spaced pairs of slits extending longitudinally of the web, folding the slitted web across the slits and disposing the unslitted portions of the web that are aligned with a pair of slits in superposed order, inserting staples in the web between the successive pairs of slits, and severing the superposed unslitted portions of the web.

16. The method of making saddle staples which comprises forming a succession of spaced pairs of aligned slits transversely disposed in a web and inset from the margins thereof, the succession of spaced pairs of slits extending longitudinally of the web, folding the slitted web across the slits and disposing the unslitted portions of the web that are aligned with a pair of slits in superposed order, inserting staples in the web between the successive pairs of slits and with the prongs of the staples within the folded portions of the web, and severing the superposed unslitted portions of the web.

17. The method of making saddle staples which comprises forming a succession of spaced pairs of aligned slits transversely disposed in a web and inset from the margins thereof, the succession of spaced pairs of slits extending longitudinally of the web, perforating the web between the successive pairs of slits, folding the slitted and perforated web across the slits and disposing in superposed order the unslitted portions of the web that are aligned with a pair of slits, inserting staples in the perforations, and severing the superposed unslitted portions of the web.

18. The method of making saddle staples which comprises advancing a web through a forming position and forming the web into saddle shape thereat, advancing the formed web through a stapling position and inserting a series of staples in the formed web, advancing the stapled web to a severing position and severing the web between successive staples, and constantly maintaining at least one staple in the formed web between the forming and severing positions so that the staple will retain the web in formed condition during the staple-inserting operation.

19. The method of making saddle staples which comprises partially transversely severing a web into a series of sections longitudinally disposed along the web, forming the web into saddle shape, inserting staples in the partially severed sections, reflexing the stapled web to spread apart the sections, and completely severing the web between the spread sections.

20. The method of making saddle staples which comprises forming a longitudinal succession of transverse slits in a web, folding the web across the slits, inserting staples in the web between successive slits, reflexing the stapled web to spread the slits, and severing the web between the spread slits.

21. The method of making saddle staples which comprises progressively folding a web longitudinally to provide a middle inverted channel and upright channels on opposite sides of the middle channel, further folding the web by turning the outer sides of the outer channels inwardly toward each other and into position on top of the web of the middle channel, inserting a succession of staples longitudinally spaced in the web with the prongs passing through the outer channels, and severing the web between successive staples.

22. The method of making saddle staples which comprises progressively folding a web longitudinally to provide a middle inverted channel and outstanding marginal sections, further folding the web to bring the marginal sections in parallel relation and to form upright channels on opposite sides of the middle channel, further folding the web by turning the outer sides of the outer channels inwardly toward each other and into position on top of the web of the middle channel, inserting a succession of staples longitudinally positioned in the web with the prongs thereof passing through the outer channels, and severing the web between successive staples.

23. The method of making saddle staples which comprises forming a section of a web into saddle shape, inserting a staple completely into position in said formed section while said section remains connected to said web, and severing said stapled section from said web only after the staple has been completely inserted therein.

24. A machine for making insulated saddle staples comprising means for progressively forming an insulating web into saddle shape, means for inserting a series of staples into the formed web prior to severing the web between the staples, and means for severing the web between the successive staples.

25. A machine for making insulated saddle staples comprising means for forming a section of an insulating web into saddle shape, means for driving a staple completely into position in the formed section, and means for severing the formed stapled section from the web only after the staple has been completely inserted therein.

26. A machine for making saddle staples comprising a plurality of successively-acting web folding devices and a staple driving device, means for presenting a web to the successive action of said folding devices and thence to said staple driving device which inserts a series of staples in spaced relation longitudinally of the folded web, and means for severing the folded web between successive staples.

27. A machine for making saddle staples comprising means for forming a portion of a web into saddle shape, means for driving a staple in the formed portion of the web, and means for subsequently severing said formed stapled portion from the web.

28. A machine for making saddle staples comprising means for progressively folding an advancing web, means for progressively inserting staples in the folded web, and means for severing the web between successive staples, said web severing means being so spaced from said staple inserting means that there are always a plurality of staples in the formed web between said spaced means.

29. A machine for making saddle staples comprising means for forming rows of perforations in and lengthwise of a web, means for folding the perforated web, means for inserting a series of staples in the perforations of the folded web, and means for severing the web between successive staples.

30. A machine for making saddle staples comprising means for forming a repetition of two pairs of aligned perforations in spaced relation in the opposite marginal portions and lengthwise of a flat web, means for folding the perforated web lengthwise thereof in a progressive manner, means for inserting a staple in each two pairs of perforations, and means for severing the web between successive staples.

31. A machine for making saddle staples, comprising means for partially severing a web into saddle sections, means for inserting staples in the partially severed saddle sections, and means for completely severing the successive stapled saddle sections.

32. A machine for making saddle staples comprising means for partially severing a web into saddle sections, means for folding the partially severed sections into saddle shape, means for inserting staples in the folded saddle sections, and means for completely severing the successive partially severed stapled saddle sections.

33. A machine for making saddle staples comprising means for forming a repetition of two pairs of aligned perforations in spaced relation in the opposite marginal portions and lengthwise of a web, means for partially severing the web between each two pairs of perforations, means for folding the web into saddle shape, means for inserting a staple in each two pairs of perforations of the folded web, and means for completely severing the web along the lines of partial severance thereof.

34. A machine for making saddle staples comprising means for forming a repetition of two pairs of aligned perforations in spaced relation in the opposite marginal portions and lengthwise of a web, means for forming a repetition of a pair of aligned slits extended transversely of the web between each two pairs of perforations, means for folding the web longitudinally and across said slits, means for inserting a staple in each two pairs of perforations, and means for severing the web along the line of each pair of slits.

35. A machine for making saddle staples comprising means for folding a web longitudinally to provide an inverted longitudinal channel in the middle thereof and upturned marginal portions, other folding means operative on the partially folded web to move said marginal portions toward each other to form upright channels on opposite sides of said inverted channel, additional folding means operative on the channeled web to fold the marginal edges of the web into confronting relation with each other and superposed above the web of said inverted channel, means for inserting staples in said folded web with the prongs in said upright channels and the heads overlying the confronting edges of the web, and means to sever the stapled web between successive staples.

36. A machine for making saddle staples comprising means for progressively folding an advancing web longitudinally to provide a longitudinal open channel in the middle thereof and closed channels on opposite sides of said open channels and with the marginal edges of the web disposed in confronting relation upon the bottom wall of said open channel, means for inserting a series of staples in spaced relation in and lengthwise of the folded web with the prongs of each staple extended through said closed channels and spanning said open channel and with the head of each staple overlying the confronting edges of the web, and means for severing the stapled web between successive staples.

37. A machine for making saddle staples comprising means for folding a flat web longitudinally into saddle shape including a plurality of successively acting pairs of folding rolls from one to the other of which the web is advanced and is folded in a progressive manner, means for inserting a series of staples in the folded web, and means for severing the stapled web portions from the web.

38. A machine for making saddle staples comprising perforating mechanism for providing a series of staple receiving perforations in a flat web, a succession of successively acting pairs of folding rolls for progresively folding the perforated web into saddle shape, stapling mechanism for inserting staples in the perforations of the folded web, and severing mechanism for severing the stapled portions of the web from the web.

39. A machine for making saddle staples comprising slitting and perforating mechanisms for forming a series of alternate slits and perforations in a web, folding mechanism including a plurality of successively acting pairs of folding rolls for folding the slitted and perforated web longitudinally into saddle shape, stapling mechanism for inserting staples in the perforations of the folded web, and severing mechanism for severing the web at and in line with the successive slits therein.

40. A machine for making saddle staples including folding rollers for folding a web longitudinally into saddle shape, stapling mechanism for inserting staples in the folded web, severing mechanism for severing the stapled web between successive staples, and web advancing mechanism including rollers which are in driving engagement with the web and which govern the advance of the web through said folding rollers and said stapling and severing mechanism.

41. A machine for making saddle staples comprising web advancing means including driving rollers which engage and advance a flat web, stapling mechanism through which the web is advanced, severing mechanism for severing the web between successive staples, and folding mechanism for folding the flat web into saddle shape including folding rollers located between said web advancing rollers and said stapling mechanism, and means for driving said folding rollers, said web advancing rollers being in complete control of the advance of the web at all times and there being a slipping engagement between the web and said folding rollers.

42. A machine for making saddle staples comprising freely rotatable web-folding rollers, stapling mechanism for inserting staples in the folded web, severing mechanism for severing the web between successive staples, and web advancing means for advancing the web to said mechanisms and for pushing the web through said folding rollers.

43. In a saddle staple machine, the combination of stapling mechanism for inserting staples in a folded web, and means for folding the web into channel shape including co-acting positively driven rollers having fixedly rotatable therewith peripheral flanges which engage the middle part of the web, and other peripheral flanges that are freely rotatable and which engage and fold marginal portions of said web.

44. In a saddle staple machine, the combination of stapling mechanism for inserting staples in a folded web, and means for folding the web comprising positively driven rotatable elements for engaging between them a section of the web that is not to be folded and other freely rotatable elements for engaging and for folding other sections of the web and adapted to be rotated by the web.

45. A machine for making saddle staples comprising means for slitting a web transversely along lines of subsequent severance, means for inserting staples in the web between successive slits thereof, and means including a severing knife adapted to enter the successive slits and completely sever the web.

46. A machine for making saddle staples including mechanism for providing a folded stapled web that is transversely slitted between successive staples, and mechanism for severing individual saddle staples from said web including a severing knife, and means for causing said knife to enter successive slits and sever the web thereat.

47. A machine for making saddle staples including mechanism for providing a folded stapled web that is transversely slitted between successive staples, and mechanism for severing individual saddle staples from said stapled web including a severing knife arranged to enter the successive slits in said web and sever the web thereat, and means to spread open the successive slits for the entrance therein of said knife.

48. A machine for making saddle staples including mechanism for providing a folded stapled web that is transversely slitted between successive staples, and mechanism for severing individual saddle staples from said stapled web including a severing knife arranged to enter the successive slits in said web and sever the web thereat, and means to spread open the successive slits for the entrance therein of said knife comprising a track along which said web is advanced, said track having two angularly related sections successively traversed by the web and said knife being located at the junction of said track sections.

49. In a saddle staple machine, the combination of mechanism for folding a web into saddle shape, mechanism for driving staples into said web, mechanism for severing individual saddle staples from said stapled web, and web driving and guiding mechanism including a pair of web driving rollers located on opposite sides of the web and having peripheral grooves in the web engaging faces thereof, and web guiding plates engaging the web on opposite sides of said rolls and having parts which extend through said grooves on opposite sides of the web and are terminated at said folding mechanism to guide the web in straight condition through said web-driving rolls.

50. In a saddle staple machine, the combination of web-folding mechanism including a pair of folding rollers having cooperating web-engaging flanges and other elements that fold the web at the sides of said flanges into channel shape, a track arranged in line with said flanges and entering the channel of said advancing web, other folding rollers having flanges that are in line with said track and enter the web channel and have other elements that fold the web at the sides of said channel, a second track that is in line with the flanges of said other rollers and enters the web channel, a third set of folding rollers disposed on opposite sides of and having parts that overlie the top of said second track and fold the marginal edges of the web over the channel thereof, stapling mechanism which inserts a series of staples in the folded web on said second track behind said third set of rollers, and mechanism for severing the web between successive staples.

51. In a saddle staple machine, stapling mechanism including a staple carrier having a plurality of staple-receiving elements, means to insert pre-formed staples in successive manner in said elements, means to move said carrier to locate successive staples in a staple driving position, and means to drive the successively located staples into saddles.

52. In a saddle staple machine, stapling mechanism including a staple carrier having a plurality of staple-receiving elements, means to insert pre-formed staples in successive manner in said elements, means to move said carrier to locate successive staples in a staple driving position, means to present successive portions of a saddle web to the successively located staples, and means to drive the successive staples into said web.

53. In a saddle staple machine, a stapling mechanism including a staple carrier having a plurality of staple-receiving elements, means to hold a stack of pre-formed staples, means to remove successive end staples from the stack and to insert them in successive elements, means to advance said carrier to locate successive staples in delivery position, and driving means which moves the successive staples out of said elements.

54. In a saddle staple machine, stapling mechanism including a rotatable staple carrier having a plurality of staple-receiving slots, means to rotate said carrier in a step by step manner to position said slots successively in staple-receiving and staple-delivering positions, means to insert successive staples in said slots when they are in staple-receiving position, and means to drive staples out of said successive slots when they are in delivery position.

55. In a saddle staple machine, stapling mechanism comprising a rotatable carrier having a plurality of staple-receiving slots therein, a member rotatable with said carrier having a plurality of spring-pressed fingers provided with staple-receiving slots aligned with the slots of said carrier, means for rotating said carrier and member in a step by step manner, means providing a stack of staples, means for removing the successive end staples from said stack and for inserting them in successive slots in said carrier and fingers, and means for driving successive staples out of said rotated carrier and fingers.

56. In a saddle staple machine, stapling mechanism comprising a rotatable carrier having a plurality of staple-receiving slots therein, a member rotatable with said carrier having a plurality of spring-pressed fingers provided with staple-receiving slots aligned with the slots of said carrier, means for rotating said carrier and member in a step by step manner, means providing a stack of staples, a reciprocating pusher for engaging and removing successive end staples from said stack and for inserting them between said carrier and said fingers, means for driving the successive staples out of said rotated carrier and fingers, and reciprocating mechanism for said pusher including a reciprocable member and a yielding connection between said member and pusher arranged to yield and prevent the reciprocation of said pusher upon undue resistance to reciprocation thereof.

GEORGE E. RYAN.